US012745236B2

(12) United States Patent
Hong

(10) Patent No.: US 12,745,236 B2
(45) Date of Patent: Sep. 22, 2026

(54) RESOURCE SCHEDULING METHOD AND APPARATUS, COMMUNICATION DEVICE AND STORAGE MEDIUM

(71) Applicant: Beijing Xiaomi Mobile Software Co., Ltd., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 544 days.

(21) Appl. No.: 18/008,104

(22) PCT Filed: Jun. 3, 2020

(86) PCT No.: PCT/CN2020/094244
§ 371 (c)(1),
(2) Date: Dec. 2, 2022

(87) PCT Pub. No.: WO2021/243618
PCT Pub. Date: Dec. 9, 2021

(65) Prior Publication Data
US 2023/0276430 A1 Aug. 31, 2023

(51) Int. Cl.
*H04W 72/20* (2023.01)
*H04W 72/1263* (2023.01)

(52) U.S. Cl.
CPC ....... *H04W 72/1263* (2013.01); *H04W 72/20* (2023.01)

(58) Field of Classification Search
None
See application file for complete search history.

(56) References Cited

U.S. PATENT DOCUMENTS

2010/0083262 A1* 4/2010 Gulati .................. G06F 9/5011 718/102
2014/0038654 A1* 2/2014 Ahmadi ................ H04W 76/14 455/517
2015/0120942 A1* 4/2015 Ahmadi ................ H04W 72/21 455/509
2017/0303240 A1* 10/2017 Basu Mallick ....... H04W 72/12
(Continued)

FOREIGN PATENT DOCUMENTS

CN 109769207 A 5/2019
CN 110502323 A 11/2019
(Continued)

OTHER PUBLICATIONS

ISA State Intellectual Property Office of the People's Republic of China, International Search Report Issued in Application No. PCT/CN2020/094244, Feb. 20, 2021, WIPO, 4 pages.
(Continued)

*Primary Examiner* — Kodzovi Acolatse
(74) *Attorney, Agent, or Firm* — Volpe Koenig

(57) ABSTRACT

A resource scheduling method and device are provided. The method includes: sending a request message for requesting configuration of computing power resources to a second communication node; receiving a response message for the request message from the second communication node. The response message carries configuration information of the computing power resources configured by the second communication node for the first communication node.

20 Claims, 8 Drawing Sheets

(56) References Cited

U.S. PATENT DOCUMENTS

| | | | | |
|---|---|---|---|---|
| 2018/0206152 | A1* | 7/2018 | Zhang | H04W 4/24 |
| 2018/0206264 | A1 | 7/2018 | Li et al. | |
| 2019/0220311 | A1* | 7/2019 | Zhao | H04L 47/787 |
| 2019/0220316 | A1* | 7/2019 | Zhao | G06N 3/10 |
| 2020/0293697 | A1* | 9/2020 | Sion | H04L 63/10 |
| 2022/0173950 | A1* | 6/2022 | Sengupta | H04L 27/2602 |
| 2023/0144062 | A1* | 5/2023 | Liu | H04L 67/10 709/224 |

FOREIGN PATENT DOCUMENTS

| | | | | |
|---|---|---|---|---|
| CN | 110782343 | A | | 2/2020 |
| CN | 110851529 | A | | 2/2020 |
| CN | 110995614 | A | | 4/2020 |
| CN | 111124644 | A | | 5/2020 |
| CN | 111131412 | A | | 5/2020 |
| CN | 111190741 | A | | 5/2020 |
| CN | 119312937 | A | * | 1/2025 |
| WO | 2019051798 | A1 | | 3/2019 |
| WO | 202001101 | A | | 1/2020 |

OTHER PUBLICATIONS

State Intellectual Property Office of the People's Republic of China, Office Action and Search Report Issued in Application No. 202080001171X, Sep. 21, 2022, 13 pages. (Submitted with Machine/Partial Translation).

State Intellectual Property Office of the People's Republic of China, Office Action and Search Report Issued in Application No. 202080001171X, May 13, 2023, 12 pages.

ISA State Intellectual Property Office of the People's Republic of China, Written Opinion of the International Searching Authority Issued in Application No. PCT/CN2020/094244 , Feb. 20, 2021, WIPO, 6 pages.

Yu Qinglin, "From edge computing to computing power network", Industrial Technology Innovation, Industrial Science and Technology Innovation, vol. 2, Issue 3, Jan. 25, 2020, 6 pages.

* cited by examiner

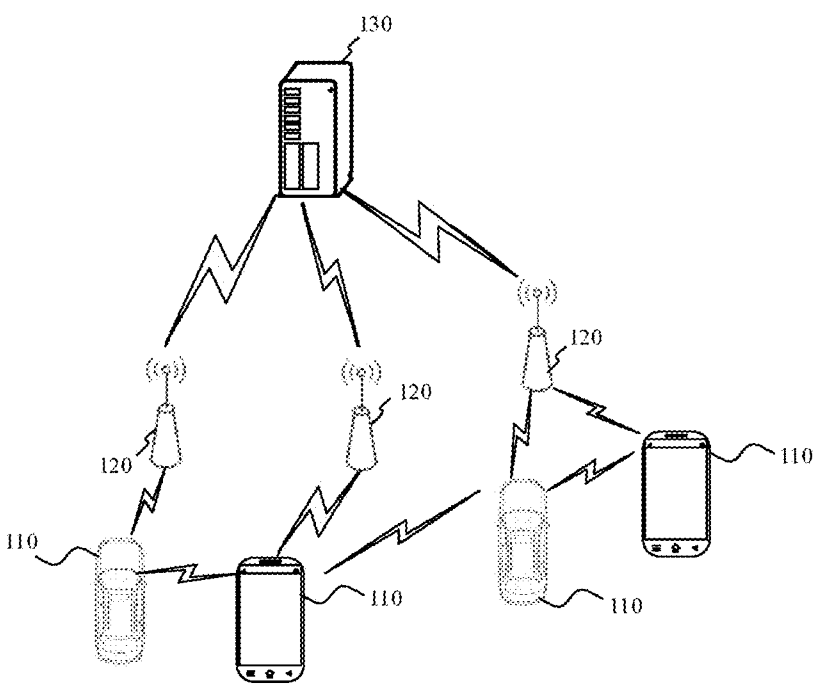
FIG. 1
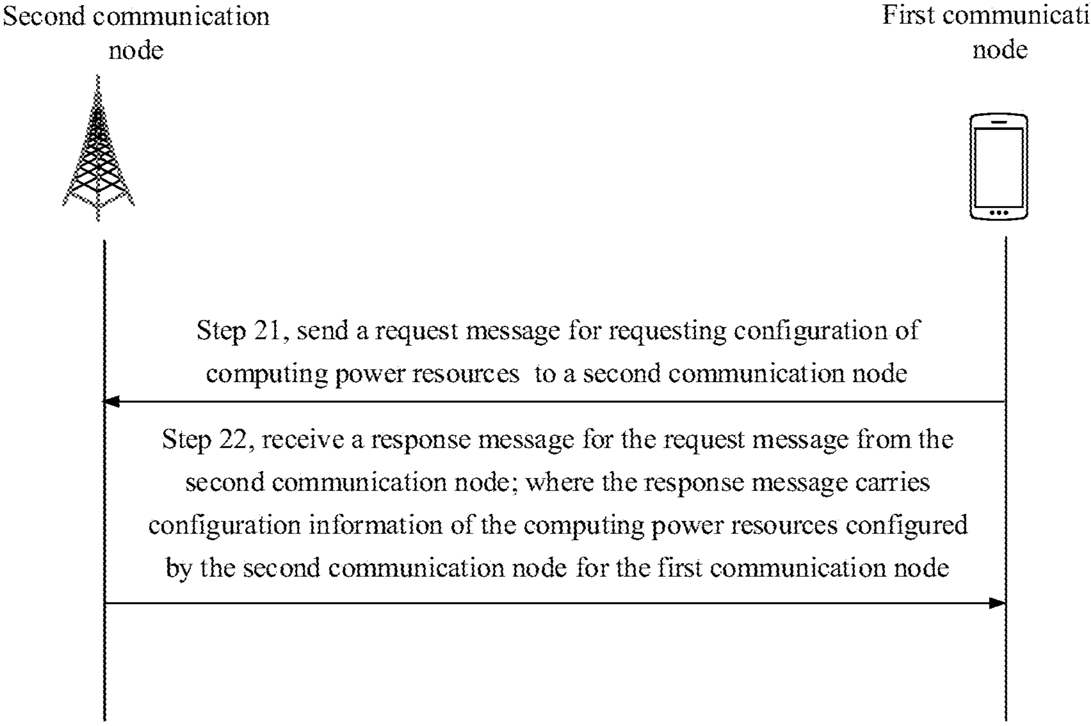
FIG. 2

Second communication node

First communication node

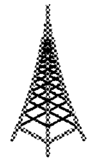

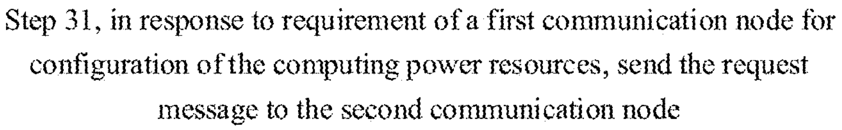

Step 22, receive a response message for the request message from the second communication node; where the response message carries configuration information of the computing power resources configured by the second communication node for the first communication node

FIG. 3

Second communication node

First communication node

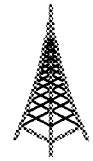

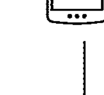

Step 41, send the request message to the base station through a Physical Uplink Control Channel (PUCCH)

Step 22, receive a response message for the request message from the second communication node; where the response message carries configuration information of the computing power resources configured by the second communication node for the first communication node

FIG. 4

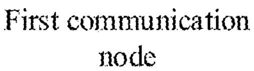
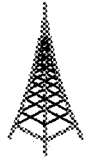
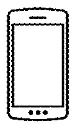
FIG. 5
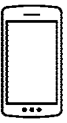
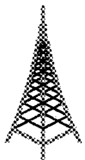
FIG. 6

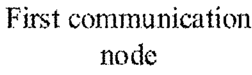
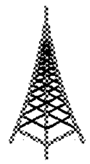
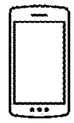
FIG. 7
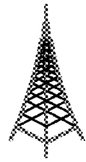
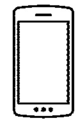
FIG. 8

RESOURCE SCHEDULING METHOD AND APPARATUS, COMMUNICATION DEVICE AND STORAGE MEDIUM

CROSS REFERENCE TO RELATED APPLICATIONS

The present application is a U.S. national phase of International Application No. PCT/CN2020/094244 filed on Jun. 3, 2020, the disclosure of which is hereby incorporated by reference in its entirety for all purposes.

TECHNICAL FIELD

The present disclosure relates to the field of wireless communication technologies, but is not limited to the field of wireless communication technologies, and in particular to a resource scheduling method and apparatus, a communication device, and a storage medium.

BACKGROUND

Along with continuous maturing and commercialization of the 5th generation mobile communication technology (5G), significant features of high rate, high reliability, and low delay, and the like of a 5G network enable a terminal side artificial intelligence (AI) to perform intelligent synergy with a cloud side AI to achieve more functions and bring better experiences to users. With the development of wireless communication technology and computer technology, more and more attention is paid to the importance of the application of AI to a wireless network terminal side in the smart phone industry, and hence, the application of AI to the fields of image processing, voice and security, and the like of smart phones is started to bring better experiences to users.

SUMMARY

In one or more embodiments of the present disclosure, a resource scheduling method and apparatus, a communication device, and a storage medium are provided.

According to a first aspect of the present disclosure, there is provided a resource scheduling method, which is applied to a first communication node and includes:

- sending a request message for requesting configuration of computing power resources to a second communication node; and
- receiving a response message for the request message from the second communication node, where the response message carries configuration information of the computing power resources configured by the second communication node for the first communication node.

According to a second aspect of the present disclosure, there is provided a resource scheduling method, which is applied to a second communication node and includes:

- receiving a request message for requesting configuration of computing power resources from a first communication node; and
- sending a response message for the request message to the first communication node based on usage of the computing power resources, where the response message carries configuration information of the computing power resources configured by the second communication node for the first communication node.

According to a third aspect of the present disclosure, there is provided a communication device, including:

- a processor; and
- a memory, storing instructions executable by the processor;
- where the processor is configured to execute the executable instructions to perform the method of any one of the embodiments of the present disclosure.

BRIEF DESCRIPTION OF THE DRAWINGS

FIG. 1 is a structural schematic diagram illustrating a wireless communication system.

FIG. 2 is a schematic diagram illustrating a resource scheduling method according to an embodiment of the present disclosure.

FIG. 3 is a flowchart illustrating a resource scheduling method according to an embodiment of the present disclosure.

FIG. 4 is a schematic diagram illustrating a resource scheduling method according to an embodiment of the present disclosure.

FIG. 5 is a flowchart illustrating a resource scheduling method according to an embodiment of the present disclosure.

FIG. 6 is a flowchart illustrating a resource scheduling method according to an embodiment of the present disclosure.

FIG. 7 is a flowchart illustrating a resource scheduling method according to an embodiment of the present disclosure.

FIG. 8 is a flowchart illustrating a resource scheduling method according to an embodiment of the present disclosure.

DETAILED DESCRIPTION OF THE EMBODIMENTS

Figure 9:
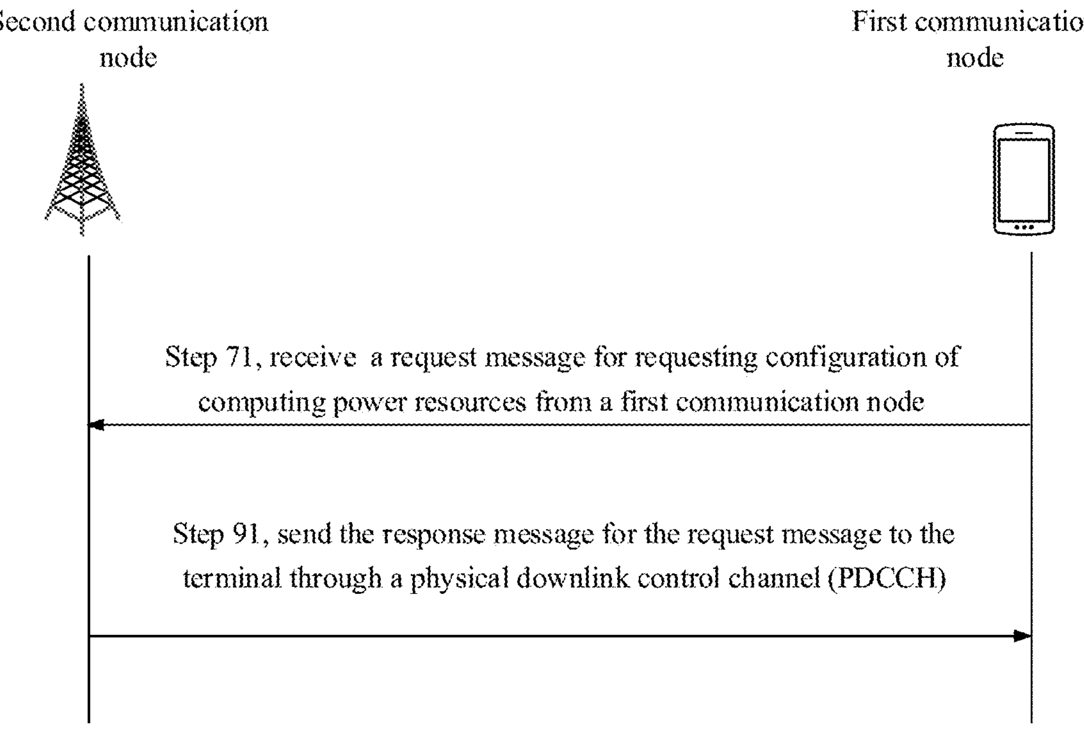
FIG. 9 is a flowchart illustrating a resource scheduling method according to an embodiment of the present disclosure.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the embodiments of the present disclosure are used for the purpose of describing particular examples only, and are not intended to limit the present disclosure. Terms determined by "a," "the," and "said" in their singular forms in the present disclosure and the appended claims are also intended to include a plurality, unless clearly indicated otherwise in the context. It should also be understood that the term "and/or" as used herein refers to and includes any and all possible combinations of one or more of the associated listed items.

It is to be understood that, although the terms "first," "second," "third," and the like may be used in the embodiments of the present disclosure to describe various information, such information should not be limited to these terms. These terms are only used to distinguish one category of information from another. For example, without departing from the scope of the present disclosure, first information may be referred to as second information, and similarly, the second information may also be referred to as the first information. Depending on the context, the term "if" as used herein may be interpreted as "when," "upon," or "in response to determining."

For the purpose of conciseness and ease of understanding, the terms used for representing a size relationship are "greater than" or "less than". For those skilled in the art, it can be understood that the term "greater than" also covers the meaning of "greater than or equal to", and the term "less than" also covers the meaning of "less than or equal to."

FIG. 1 is a structural schematic diagram illustrating a wireless communication system according to an embodiment of the present disclosure. As shown in FIG. 1, the wireless communication system is a communication system based on cellular mobile communication technology and may include a plurality of user equipment 110 and a plurality of base stations 120.

The user equipment 110 may be a device directed toward a user to provide voice and/or data connectivity. The user equipment 110 may communicate with one or more core networks through a radio access network (RAN). The user equipment 110 may be user equipment of internet of things, such as a sensor device, a mobile phone, (or called cellular phone), and a computer having user equipment of internet of things, such as a fixed, portable, pocket-sized, handheld, or computer-inbuilt or vehicle-mounted apparatus, for example, station (STA), subscriber unit, subscriber station, mobile station, mobile, remote station, access point, remote terminal, access terminal, user terminal, user agent, user device, or user equipment. In some examples, the user equipment 110 may also be a device of an unmanned aerial vehicle, or a vehicle-mounted device, for example, may be an electronic control unit having a wireless communication function, or a wireless user device externally connected to an electronic control unit. In some examples, the user equipment 110 may be a roadside device, for example, a road lamp, signal lamp, or other roadside devices having a wireless communication function.

The base station 120 may be a network-side device in a wireless communication system. The wireless communication system may be a fourth-generation mobile communication technology (4G) system, which is also called Long Term Evolution (LTE) system. In some examples, the wireless communication system may also be a 5G system, which is also called a new radio (NR) system or 5G NR system. In some examples, the wireless communication system may also be a next-generation system of the 5G system. An access network in the 5G system may be referred to as New Generation-Radio Access Network (NG-RAN).

The base station 120 may be an evolved base station (eNB) employed in the 4G system. In some examples, the base station 120 may also be a base station adopting centralized distributed architecture (gNB) in the 5G system. When adopting the centralized distributed architecture, the base station 120 usually includes a central unit (CU) and at least two distributed units (DU). In the central unit, protocol stacks of a Packet Data Convergence Protocol (PDCP) layer, a Radio Link Control (RLC) layer, and a Media Access Control (MAC) layer are disposed; in the distributed unit, a physical (PHY) layer protocol stack is disposed. The specific implementations of the base station 120 are not limited to the embodiments of the present disclosure.

A wireless connection may be established between the base station 120 and the user equipment 110 through a wireless air interface. In different implementations, the wireless air interface is a wireless air interface based on the fourth generation mobile communication network technology (4G) standard; or, the wireless air interface is a wireless air interface based on the fifth generation mobile communication network technology (5G) standard, for example, the wireless air interface is a new radio; or, the wireless air interface may also be a wireless air interface based on a next generation mobile communication network technology standard of 5G.

In some embodiments, end-to-end (E2E) connection may also be established between the user equipment 110, for example, in the scenarios of vehicle-to-vehicle (V2V) communication, vehicle-to-Infrastructure (V2I) communication, and vehicle-to-pedestrian (V2P) communication, and the like in vehicle-to-everything (V2X) communication.

The above user equipment may be considered as a terminal device in the following embodiments.

In some embodiments, the above wireless communication system may also include a network management device 130.

A plurality of base stations 120 are connected to the network management device 130, respectively. The network management device 130 may be a core network device in the wireless communication system. For example, the network management device 130 may be a Mobility Management Entity (MME) in an Evolved Packet Core (EPC). In some examples, the network management device may also be another core network device, such as Serving GateWay (SGW), Public Data Network GateWay (PGW), Policy and Charging Rules Function (PCRF), or Home Subscriber Server (HSS). The implementation morphology of the network management device 130 is not limited to the embodiments of the present disclosure.

In order to help understand any one embodiment of the present disclosure, an application scenario of artificial intelligence (AI) is firstly described using several embodiments.

In an embodiment, a terminal side AI can quickly respond to user requirements and quickly display processed images, videos, voices, and text information to users with low power consumption and low costs, and thus it is suitable for AI reasoning tasks.

In an embodiment, a cloud-side AI is applied to carry out multi-terminal data convergence and has advantages in the aspects of data throughput and processing rate and the like and thus it is suitable for AI model training tasks. Therefore, the AI processing mode of the synergy of the terminal and cloud end may play an important role in model training and data reasoning, and the like.

In an embodiment, a command sent by a user is preliminarily processed in a terminal-side intelligent chip and then interacted with a cloud end through a 5G network in real time, and then a processing result of the cloud end is fed back to the user through the 5G network. Thus, data processing capability can be improved, and delay can be effectively reduced.

As shown in FIG. 2, in an embodiment, there is provided a resource scheduling method, which is applied to a first communication node and includes the following steps.

At step 21, a request message for requesting configuration of computing power resources is sent to a second communication node.

At step 22, a response message for the request message is received from the second communication node, where the response message carries configuration information of the computing power resources configured by the second communication node for the first communication node.

In an embodiment, the first communication node and/or the second communication node may be, but are not limited to a smart phone, a wearable device, a vehicle-mounted terminal, a road size unit (RSU), an intelligent household terminal, an industrial sensor device, and/or a medical device or the like.

In an embodiment, the first communication node and/or the second communication node may be a base station of any type, for example, a 3G base station, a 4G base station, a 5G base station, or another evolved base station. The base station is an interface device of an access network of the terminal.

In an embodiment, the first communication node may be a base station, and the second communication node may be a terminal.

In an embodiment, the first communication node may be a terminal, and the second communication node may be a base station.

In an embodiment, the terminal may send a request message for requesting configuration of computing power resources to the base station, and the base station may, after receiving the request message from the terminal, send a response message for the request message to the terminal, and thus, the terminal may receive the response message. Because the response message carries the configuration information of the computing power resources configured by the base station for the first communication node, the terminal can perform data processing by using the computing power resources of the base station.

The request message carries identifier information of the terminal, which is used by the base station to identify the terminal.

In an embodiment, the base station may send a request message for requesting configuration of computing power resources to the terminal, and the terminal may, after receiving the request message from the base station, send a response message for the request message to the base station, and thus, the base station may receive the response message. Because the response message carries the configuration information of the computing power resources configured by the terminal for the first communication node, the base station can perform data processing by using the computing power resources of the terminal.

The request message carries identifier information of the base station, which is used by the terminal to identify the base station.

In an embodiment, when starting an application, the first communication node sends a message for requesting configuration of computing power resources to the second communication node. For example, when starting a Virtual Reality (VR) or Augmented Reality (AR) application for performing massive image data processing, the first communication node sends a message for requesting the configuration of computing power resources to the second communication node. In this way, the VR or AR can use the computing power resources allocated by the second communication node to perform massive image data processing.

In an embodiment, a communication node configures computing power resources for another node, which means allocating computing power resources to another communication node for use.

In an embodiment, the computing power resources may be computing resources to be used in the data processing. The computing power resources may be software resources and/or hardware resources. For example, the computing power resources may be neural network algorithm model resources for graphics processing.

The computing power resources may be a processor and/or memory or the like, which has a mass data processing capability.

In an embodiment, the first communication node is a terminal, the second communication node is a base station, and the computing power resources are sample training model resources. When the terminal does not have the capability to perform training processing for mass data, the terminal may request the base station to configure the sample training model resources for the terminal and perform sample training using the sample training model resources configured by the base station for the terminal, and after completing the training, obtain a sample training result from the base station.

In an embodiment, the first communication node is a terminal, the second communication node is a base station, and the computing power resources are storage resources. When the terminal does not have the capability to store mass data, the terminal may request the base station to configure storage resources for the terminal and store the mass data in the storage resources allocated by the base station to the terminal.

In an embodiment, the first communication node may, based on the requirement for computing power resources, send a request message for requesting configuration of computing power resources to the second communication node.

In an embodiment, when the first communication node requires human face algorithm model resources for data training and 1G of storage resources, the first communication node may send a request message for requesting configuration of the human face algorithm model resources and the 1G of storage resources to the second communication node. The second communication node, after receiving the request message, may configure the human face algorithm model resources and the 1G of storage resources for the first communication node, and send a response message for the request message to the first communication node. The first communication node may use the human face algorithm model resources and the 1G of storage resources configured by the second communication node for the first communication node based on the response message.

In an embodiment, the first communication node may, based on a requirement for computing power resources, send a request message for requesting configuration of computing power resources to a plurality of second communication nodes. Thus, these different second communication nodes can each configure computing power resources for the first communication node.

In an embodiment, the first communication node requires human face algorithm model resources for performing image data processing, voice processing algorithm model resources for performing voice data processing, and 2G of storage resources. In this case, the first communication node may send a first request message for requesting configuration of the human face algorithm model resources to a second communication node A, and send a second request message for requesting configuration of the voice processing algorithm model resources and the 2G of storage resources to a second communication node B. The second communication node A, after receiving the first request message, configures the human face algorithm model resources for the first communication node, and sends a response message for the first request message to the first communication node. The second communication node B, after receiving the second request message, configures the voice processing algorithm model resources and the 2G of storage resources for the first communication node and sends a response message for the second request message to the first communication node. Thus, the first communication node can, based on the response messages, use the human face algorithm model resources, the voice processing algorithm model resources, and the 2G of storage resources configured by the second communication nodes for the first communication node.

In an embodiment, the request message may include at least one of the following: a time length for occupying the computing power resources, a start time for occupying the computing power resources, an end time for occupying the computing power resources, an amount of the occupied computing power resources, and a category of the occupied computing power resources.

In an embodiment, the time length for occupying the computing power resources is 2 hours, and the start time for occupying the computing power resources is two ten.

In an embodiment, the start time for occupying the computing power resources is two o'clock, and the end time for occupying the computing power resources is three ten.

In an embodiment, the occupied computing power resources are storage resources. Thus, the amount of the occupied computing power resources may be a size of the occupied storage resources, for example, 2G of the occupied storage resources.

In an embodiment, the occupied computing power resources may be an algorithm model, and thus, the category of the occupied algorithm model may be a name of the occupied algorithm model, for example, a name "RL-1" of a human face algorithm model.

In an embodiment, the second communication node configures computing power resources for the first communication node, which means providing computing power resources available to the second communication node to the first communication node for use. For example, when the second communication node has 10G of available storage resources, the second communication node may provide all or part of 10G of storage resources to the first communication node for use based on the request of the first communication node.

In an embodiment, the first communication node may predetermine a maximum amount of computing power source provided by each second communication node and a category of the computing power resources, and the like. For example, the first communication node may predetermine that a second communication node A can provide a maximum of 2G of storage resources, and another second communication node B can provide a maximum of 10G of storage resources. When the first communication node requests configuration of storage resources, the first communication node may first send a request message to the second communication node B capable of providing more storage resources. Thus, it is more possible that the first communication node B can obtain the storage resources. For another example, the first communication node may predetermine that a second communication node A can provide image processing model resources and another second communication node B can provide voice processing model resources. When the first communication node requests configuration of the voice processing model resources, the first communication node may first send a request message to the second communication node B. In this way, the first communication node can more accurately obtain desired computing power resources.

In an embodiment, the second communication node configures computing power resources for the first communication node, which also means configuring computing power resources available to a third communication node to the first communication node for use. For example, when the third communication node has 10G of available storage resources, the second communication node may, based on the request of the first communication node, configure all or part of 10G of storage resources available to the third communication node for the first communication node for use.

In an embodiment, the first communication node may predetermine a maximum amount of computing power source configured by the second communication node and a category of the computing power resources, and the like. Here, the maximum amount of computing power resources configured by the second communication node may be a maximum amount of computing power resources of all communication nodes, which can be configured by the second communication node. The category of the computing power resources configured by the second communication node may be a category of the computing power resources of all communication nodes, which can be configured by the second communication node. For example, the computing power resources of a third communication node A, a third communication node B, and a third communication node C can be configured by the second communication node for the first communication node for use. Further, the third communication node A has 3G of storage resources for configuration, the third communication node B has 2G of storage resources for configuration, and the third communication node C has 1G of storage resources for configuration. In this case, the maximum amount of the computing power resources configured by the second communication node is a sum of the configurable storage resources of the third communication nodes A, B, and C, i.e., 6G of storage resources. Here, the first communication node may predetermine the maximum amount of computing power source configured by each second communication node and the category of the computing power resources and the like, and thus can send a specific request message to the second communication nodes so as to accurately obtain desired computing power resources from the second communication nodes.

In an embodiment, after receiving the request message, the second communication node may, based on the usage of the computing power resources, configure available computing power resources for the first communication node.

In an embodiment, when the amount of the computing power resources available to the second communication node is greater than an amount requested by the request message, computing power resources are configured for the first communication node. For example, when the amount of the computing power resources available to the second communication node is greater than the amount requested by the request message, the second communication node has available computing power resources sufficient to satisfy the first communication node, and thus the second communication node may, based on the request of the first communication node, configure the computing power resources for the first communication node. In this way, the utilization rate of the computing power resources of the second communication node can be improved. For example, when the second communication node can provide at most 10G of storage resources, 5G of storage resources may be configured for a third communication node with 5G of available storage resources left. In this case, if a request message for requesting configuration of 2G of storage resources is received from the first communication node, 2G of storage resources may be configured for the first communication node.

In an embodiment, when the amount of the computing power resources available to the second communication node is less than an amount requested by the request message, an amount of available computing power resources may be configured for the first communication node, or no computing power resource is configured for the first communication node. For example, when the amount of the computing power resources available to the second communication node is less than an amount requested by the request message, although the amount of the computing power resources available to the second communication node is insufficient to satisfy the first communication node, the available computing power resources can be still provided to the first communication node to satisfy partial requirements of the first communication node for the computing power resources. For example, when the second communication node can provide at most 10G of storage resources, 6G of storage resources may be configured for a third communication node, with 4G of storage resources left. In this case, if a request message for requesting configuration of 5G of storage resources is received from the first communication node, the second communication node may configure all its available resources, i.e., 4G of available storage resources, for the first communication node.

In an embodiment, the configuration information may include at least one of the following:

- a time length for occupying the computing power resources, a start time for occupying the computing power resources, an end time for occupying the computing power resources, an amount of the occupied computing power resources, and a category of the occupied computing power resources.

In an embodiment, the configuration information includes the following: the time length for occupying the computing power resources is 2 hours, and the start time for occupying the computing power resources is two ten.

In an embodiment, the configuration information includes the following: the start time for occupying the computing power resources is two o'clock and the end time for occupying the computing power resources is three ten.

In an embodiment, the occupied computing power resources are storage resources. The configuration information includes a size of the occupied storage resources. For example, the configuration information includes 2G of occupied storage resources.

In an embodiment, the occupied computing power resources may be an algorithm model. The configuration information includes a name of the occupied algorithm model. For example, the configuration information includes a name "RL-1" of a human face algorithm model.

In an embodiment, the configuration information includes the following: the time length for occupying the Central Processing Unit (CPU) resources is 2 hours, the start time for occupying the CPU resources is one ten, the amount of occupied resources is two CPUs, and the category of the occupied computing power resources is CPU resource.

In an embodiment, the amount of the computing power resources configured for the first communication node based on the configuration information may be less than the amount of the computing power resources requested by the first communication node. For example, the first communication node requests a configuration of 10G of computing power resources, but the second communication node A can only configure 5G of computing power resources for the first communication node and thus send configuration information indicating configuring 5G of computing power resources to the first communication node. After receiving the configuration information, the first communication node confirms that the computing power resources configured by the second communication node A are insufficient and then requests the second communication node B to configure the remaining 5G of computing power resources. In this way, the second communication node A and the second communication node B can cooperatively satisfy the configuration requirements of the first communication node for 10G of storage resources.

In an embodiment, the first communication node requests a configuration of 2G of storage resources, and the second communication node can only configure 1G of storage resources for the first communication node. In this case, the amount of computing power resources configured for the first communication node based on the configuration information may be 1G.

In an embodiment, the amount of computing power resources configured for the first communication node based on the configuration information may be 0. For example, when the second communication node has no additional computing power resource configurable to other communication nodes, the amount of computing power resources configured for the first communication node based on the configuration information may be 0.

In an embodiment, the first communication node can obtain, by request, the configuration information of the computing power resources configured by the second communication node for the first communication node, and hence, the first communication node can, based on the configuration information of the computing power resources, use the computing power resources configured by the second communication node for the first communication node to perform data processing. Thus, the data processing capability of the first communication node is improved. Further, since the first communication node uses the computing power resources of the second communication node to perform data processing, the resource utilization rate of the computing power resources of the second communication node can be improved.

As shown in FIG. 3, in an embodiment of the present disclosure, there is provided a resource scheduling method, where sending a request message for requesting configuration of computing power resources to a second communication node at step 21 includes:

- at step 31, in response to the requirement of a first communication node for configuration of the computing power resources, sending the request message to the second communication node.

In an embodiment, when starting a predetermined application, the first communication node sends the request message to the second communication node. For example, one application set including several predetermined applications may be preset. The predetermined application may be an application for image processing, for example, photographing software.

In an embodiment, when no response message for a request message is received within a set time period after the request message is sent to the second communication node A, a request message is sent to a second communication node B. For example, when no response message for a request message is received within one minute after the request message is sent to the second communication node A, it is confirmed that the second communication node A has no available computing power resource. In this case, a request message may be sent to the second communication node B to request the configuration of computing power resources. Thus, when the second communication node A has no available computing power resource, the second communication node B may be requested to configure computing power resources.

As shown in FIG. 4, in an embodiment of the present disclosure, there is provided a resource scheduling method, where a first communication node is a terminal, and a second communication node is a base station; at step 21, sending a request message for requesting configuration of computing power resources to the second communication node at step 21 includes:

at step 41, sending the request message to the base station through a Physical Uplink Control Channel (PUCCH).

In an embodiment, when the terminal has a requirement for using computing power resources, the terminal may send a request message to the base station through the PUCCH.

Here, the request message is sent to the base station through the PUCCH. Since data transmission over the PUCCH is more reliable and more timely, the request message can be sent to the base station more reliably and more quickly. Thus, transmission delay is reduced, and the reliability of sending the request message is improved.

As shown in FIG. 5, in an embodiment of the present disclosure, there is provided a resource scheduling method, where a first communication node is a terminal, and a second communication node is a base station; at step 21, sending a request message for requesting configuration of computing power resources to the second communication node at step 21 includes:

at step 51, sending the request message to the base station through a wireless resource scheduling request (SR).

In an embodiment, when the terminal has a requirement for using computing power resources, the terminal may send a request message to the base station through the wireless resource scheduling request (SR).

As shown in FIG. 6, in an embodiment of the present disclosure, there is provided a resource scheduling method, where a first communication node is a base station, and a second communication node is a terminal; at step 21, sending a request message for requesting configuration of computing power resources to the second communication node at step 21 includes:

at step 61, sending the request message to the terminal through a physical downlink control channel (PDCCH).

In an embodiment, when the base station has a requirement for using computing power resources, the base station may send a request message to the terminal through the PDCCH.

Here, the request message is sent to the terminal through the PDCCH. Since data transmission over the PDCCH is more reliable and more timely, the request message can be sent to the terminal with increased speed and reliability. Thus, transmission delay is reduced and the reliability of sending the request message is improved.

As shown in FIG. 7, in an embodiment of the present disclosure, there is provided a resource scheduling method, which is applied to a second communication node. The method includes the following steps.

At step 71, a request message for requesting configuration of computing power resources is received from a first communication node.

In an embodiment, the first communication node and/or the second communication node may be but are not limited to a smart phone, a wearable device, a vehicle-mounted terminal, a road size unit (RSU), an intelligent household terminal, an industrial sensor device, and/or a medical device or the like.

In an embodiment, the first communication node and/or the second communication node may be a base station of any type, for example, a 3G base station, a 4G base station, a 5G base station, or another evolved base station. The base station is an interface device of an access network of the terminal.

In an embodiment, the first communication node may be a base station, and the second communication node may be a terminal.

In an embodiment, the first communication node may be a terminal, and the second communication node may be a base station.

In an embodiment, the base station may receive a request message for requesting the configuration of computing power resources from the terminal, and the base station may, after receiving the request message from the terminal, send a response message for the request message to the terminal, and thus, the terminal may receive the response message. Because the response message carries the configuration information of the computing power resources configured by the base station for the terminal, the terminal can perform data processing by using the computing power resources of the base station.

In an embodiment, the request message carries identifier information of the terminal, which is used by the base station to identify the terminal.

In an embodiment, the terminal may receive a request message for requesting the configuration of computing power resources from the base station, and the terminal may, after receiving the request message from the base station, send a response message for the request message to the base station, and thus, the base station may receive the response message. Because the response message carries the configuration information of the computing power resources configured by the terminal for the base station, the base station can perform data processing by using the computing power resources of the terminal.

In an embodiment, when starting an application, the first communication node may send a message for requesting configuration of computing power resources to the second communication node.

In an embodiment, when starting a Virtual Reality (VR) or Augmented Reality (AR) application for performing massive image data processing, the first communication node sends a message for requesting the configuration of computing power resources to the second communication node. In this way, the VR or AR can use the computing power resources allocated by the second communication node to perform massive image data processing.

In an embodiment, a communication node configures computing power resources for another node, which means allocating computing power resources to another communication node for use.

In an embodiment, the computing power resources may be computing resources to be used in the data processing. The computing power resources may be software resources and/or hardware resources. For example, the computing power resources may be neural network algorithm model resources for graphics processing. For example, the computing power resources may be a processor and/or memory or the like, which has a mass data processing capability.

In an embodiment, the first communication node is a terminal, the second communication node is a base station, and the computing power resources are sample training model resources. When the terminal does not have the capability to perform training processing for mass data, the terminal may request the base station to configure the sample training model resources for the terminal and perform sample training using the sample training model resources configured by the base station for the terminal, and after completing the training, obtain a sample training result from the base station.

In an embodiment, the first communication node is a terminal, the second communication node is a base station, and the computing power resources are storage resources. When the terminal does not have the capability to store mass data, the terminal may request the base station to configure storage resources for the terminal and store the mass data in the storage resources allocated by the base station to the terminal.

In an embodiment, the first communication node may send a request message for requesting configuration of computing power resources to a plurality of second communication nodes. Thus, these different second communication nodes can each configure computing power resources for the first communication node.

In an embodiment, the first communication node may, based on the requirement for computing power resources, send a request message for requesting configuration of computing power resources to a second communication node.

In an embodiment, when the first communication node requires human face algorithm model resources for data training and 1G of storage resources, the first communication node may send a request message for requesting configuration of the human face algorithm model resources and the 1G of storage resources to the second communication node. The second communication node, after receiving the request message, may configure the human face algorithm model resources and the 1G of storage resources for the first communication node, and send a response message for the request message to the first communication node. The first communication node may use the human face algorithm model resources and the 1G of storage resources configured by the second communication node for the first communication node based on the response message.

In an embodiment, the first communication node requires human face algorithm model resources for performing image data processing, voice processing algorithm model resources for performing voice data processing, and 2G of storage resources. In this case, the first communication node may send a first request message for requesting configuration of the human face algorithm model resources to a second communication node A, and send a second request message for requesting configuration of the voice processing algorithm model resources and the 2G of storage resources to a second communication node B. The second communication node A, after receiving the first request message, configures the human face algorithm model resources for the first communication node, and sends a response message for the first request message to the first communication node. The second communication node B, after receiving the second request message, configures the voice processing algorithm model resources and the 2G of storage resources for the first communication node and sends a response message for the second request message to the first communication node. Thus, the first communication node can, based on the response messages, use the human face algorithm model resources, the voice processing algorithm model resources, and the 2G of storage resources configured by the second communication nodes for the first communication node.

In an embodiment, the request message may include at least one of the following: a time length for occupying the computing power resources, a start time for occupying the computing power resources, an end time for occupying the computing power resources, an amount of the occupied computing power resources, and a category of the occupied computing power resources.

In an embodiment, the time length for occupying the computing power resources is 2 hours, and the start time for occupying the computing power resources is two ten.

In an embodiment, the start time for occupying the computing power resources is two o'clock, and the end time for occupying the computing power resources is three ten.

In an embodiment, the occupied computing power resources are storage resources. Thus, the amount of the occupied computing power resources may be a size of the occupied storage resources, for example, 2G of the occupied storage resources.

In an embodiment, the occupied computing power resources may be an algorithm model, and thus, the category of the occupied algorithm model may be a name of the occupied algorithm model, for example, a name "RL-1" of a human face algorithm model.

In an embodiment, the second communication node configures computing power resources for the first communication node, which means providing computing power resources available to the second communication node to the first communication node for use. For example, when the second communication node has 10G of available storage resources, the second communication node may provide all or part of 10G of storage resources to the first communication node for use based on the request of the first communication node.

In an embodiment, the first communication node may predetermine a maximum amount of computing power source provided by each second communication node and a category of the computing power resources and the like. For example, the first communication node may predetermine that a second communication node A can provide a maximum of 2G of storage resources, and another second communication node B can provide a maximum of 10G of storage resources. When the first communication node requests configuration of storage resources, the first communication node may first send a request message to the second communication node B capable of providing more storage resources. Thus, it is more possible that the first communication node B can obtain the storage resources. For another example, the first communication node may predetermine that a second communication node A can provide image processing model resources, and another second communication node B can provide voice processing model resources. When the first communication node requests configuration of the voice processing model resources, the first communication node may first send a request message to the second communication node B. In this way, the first communication node can more accurately obtain desired computing power resources.

In an embodiment, the second communication node configures computing power resources for the first communication node, which also means configuring computing power resources available to a third communication node to the first communication node for use. For example, when the third communication node has 10G of available storage resources, the second communication node may, based on the request of the first communication node, configure all or part of 10G of storage resources available to the third communication node for the first communication node for use.

In an embodiment, the first communication node may predetermine a maximum amount of computing power source configured by the second communication node and a category of the computing power resources, and the like. Here, the maximum amount of computing power resources configured by the second communication node may be a maximum amount of computing power resources of all communication nodes, which can be configured by the second communication node. The category of the computing power resources configured by the second communication node may be a category of the computing power resources of all communication nodes, which can be configured by the second communication node. For example, the computing power resources of a third communication node A, a third communication node B, and a third communication node C can be configured by the second communication node for the first communication node for use. Further, the third communication node A has 3G of storage resources for configuration, the third communication node B has 2G of storage resources for configuration, and the third communication node C has 1G of storage resources for configuration. In this case, the maximum amount of the computing power resources configured by the second communication node is a sum of the configurable storage resources of the third communication nodes A, B, and C, i.e., 6G of storage resources. Here, the first communication node may predetermine the maximum amount of computing power source configured by each second communication node and the category of the computing power resources and the like, and thus can send a specific request message to the second communication nodes so as to accurately obtain desired computing power resources from the second communication nodes.

At step 72, based on the usage of the computing power resources, a response message for the request message is sent to the first communication node, where the response message carries configuration information of computing power resources configured by the second communication node for the first communication node.

In an embodiment, after receiving the request message, the second communication node may, based on the usage of the computing power resources, configure available computing power resources for the first communication node.

In an embodiment, when the amount of the computing power resources available to the second communication node is greater than an amount requested by the request message, computing power resources are configured for the first communication node. For example, when the amount of the computing power resources available to the second communication node is greater than the amount requested by the request message, the second communication node has available computing power resources sufficient to satisfy the first communication node, and thus the second communication node may, based on the request of the first communication node, configure the computing power resources for the first communication node. In this way, the utilization rate of the computing power resources of the second communication node can be improved. For example, when the second communication node can provide at most 10G of storage resources, 5G of storage resources may be configured for a third communication node with 5G of available storage resources left. In this case, if a request message for requesting configuration of 2G of storage resources is received from the first communication node, 2G of storage resources may be configured for the first communication node.

In an embodiment, when the amount of the computing power resources available to the second communication node is less than an amount requested by the request message, an amount of available computing power resources may be configured for the first communication node or no computing power resource is configured for the first communication node. For example, when the amount of the computing power resources available to the second communication node is less than an amount requested by the request message, although the amount of the computing power resources available to the second communication node is insufficient to satisfy the first communication node, the available computing power resources can be still provided to the first communication node to satisfy partial requirements of the first communication node for the computing power resources. For example, when the second communication node can provide at most 10G of storage resources, 6G of storage resources may be configured for a third communication node, with 4G of storage resources left. In this case, if a request message for requesting configuration of 5G of storage resources is received from the first communication node, the second communication node may configure all its available resources, i.e., 4G of available storage resources, for the first communication node.

In an embodiment, the configuration information may include at least one of the following:

a time length for occupying the computing power resources, a start time for occupying the computing power resources, an end time for occupying the computing power resources, an amount of the occupied computing power resources, and a category of the occupied computing power resources.

In an embodiment, the configuration information includes the following: the time length for occupying the computing power resources is two hours, and the start time for occupying the computing power resources is two ten.

In an embodiment, the configuration information includes the following: the start time for occupying the computing power resources is two o'clock and the end time for occupying the computing power resources is three ten.

In an embodiment, the occupied computing power resources are storage resources. The configuration information includes a size of the occupied storage resources, for example, the configuration information includes 2G of occupied storage resources.

In an embodiment, the occupied computing power resources are an algorithm model, and the configuration information includes a name of the occupied algorithm model, for example, the configuration information includes a name "RL-1" of a human face algorithm model.

In an embodiment, the configuration information includes the following: the time length for occupying the Central Processing Unit (CPU) resources is 2 hours, the start time for occupying the CPU resources is one ten, the amount of the occupied resources is two CPUs and the category of the occupied computing power resources is CPU resource.

In an embodiment, the amount of the computing power resources configured for the first communication node based on the configuration information may be less than the amount of the computing power resources requested by the first communication node. For example, the first communication node requests a configuration of 10G of computing power resources, but the second communication node A can only configure 5G of computing power resources for the first communication node and thus send configuration information indicating configuring 5G of computing power resources to the first communication node. After receiving the configuration information, the first communication node confirms that the computing power resources configured by the second communication node A are insufficient and then requests the second communication node B to configure the remaining 5G of computing power resources. In this way, the second communication node A and the second communication node B can cooperatively satisfy the configuration requirements of the first communication node for 10G of storage resources.

In an embodiment, the first communication node requests a configuration of 2G of storage resources, and the second communication node can only configure 1G of storage resources for the first communication node. In this case, the amount of computing power resources configured for the first communication node based on the configuration information may be 1G.

In an embodiment, the amount of computing power resources configured for the first communication node based on the configuration information may be 0. For example, when the second communication node has no additional computing power resource configurable to other communication nodes, the amount of computing power resources configured for the first communication node based on the configuration information may be 0.

As shown in FIG. 8, in an embodiment of the present disclosure, there is provided a resource scheduling method, where, based on usage of the computing power resources, a response message for the request message is sent to the first communication node includes:

at step 81, in response to that the computing power resources requested by the first communication node are available, and/or, an amount of the computing power resources requested by the first communication node is less than an amount of computing power resources available to the second communication node, sending the response message for the request message to the first communication node.

In an embodiment, the computing power resources requested by the first communication node are available, which means that the computing power resources are not configured for other communication nodes for use. For example, the computing power resources requested by the first communication node may be human face algorithm model resources. When the second communication node already configures the human face algorithm model resources for another communication node for use, the computing power resources are unavailable; when the second communication node does not configure the human face algorithm model resources for another communication node for use, the computing power resources are available.

In an embodiment, the second communication node may identify the usage of computing power resources. For example, when computing power resources are available, the computing power resources correspond to an identifier “1”; and when the computing power resources are currently unavailable, the computing power resources correspond to an identifier “0”.

In an embodiment, the identifier of the computing power resources may change in real time.

In an embodiment, when the communication node occupying computing power resources occupies the computing power resources, the computing power resources are correspondingly identified as “1”; when the communication node occupying computing power resources releases the computing power resources, the computing power resources are correspondingly identified as “0”.

In an embodiment, the amount of computing power resources may be an amount of storage resources.

In an embodiment, the second communication node has 10G of storage resources, 2G of which are configured for a third communication node with 8G of storage resources left. If the first communication node requests a configuration of 4G of storage resources, the second communication node may configure 4G of storage resources for the first communication node. If the first communication node requests a configuration of 9G of storage resources, the second communication node may configure 8G of storage resources for the first communication node or configure no storage resource for the first communication node.

As shown in FIG. 9, in an embodiment of the present disclosure, there is provided a resource scheduling method, where a first communication node is a terminal, and a second communication node is a base station; sending a response message for the request message to the first communication node at step 72 includes:

at step 91, sending the response message for the request message to the terminal through a physical downlink control channel (PDCCH).

In an embodiment, when the base station receives a request message, the base station may send a response message for the request message to the terminal through a PDCCH.

Here, the response message is sent to the terminal through the PDCCH. Since data transmission over the PDCCH is more reliable and more timely, the response message can be sent to the terminal with increased reliability and speed. Thus, transmission delay is reduced, and the reliability of sending the response message is improved.

Figure 10:
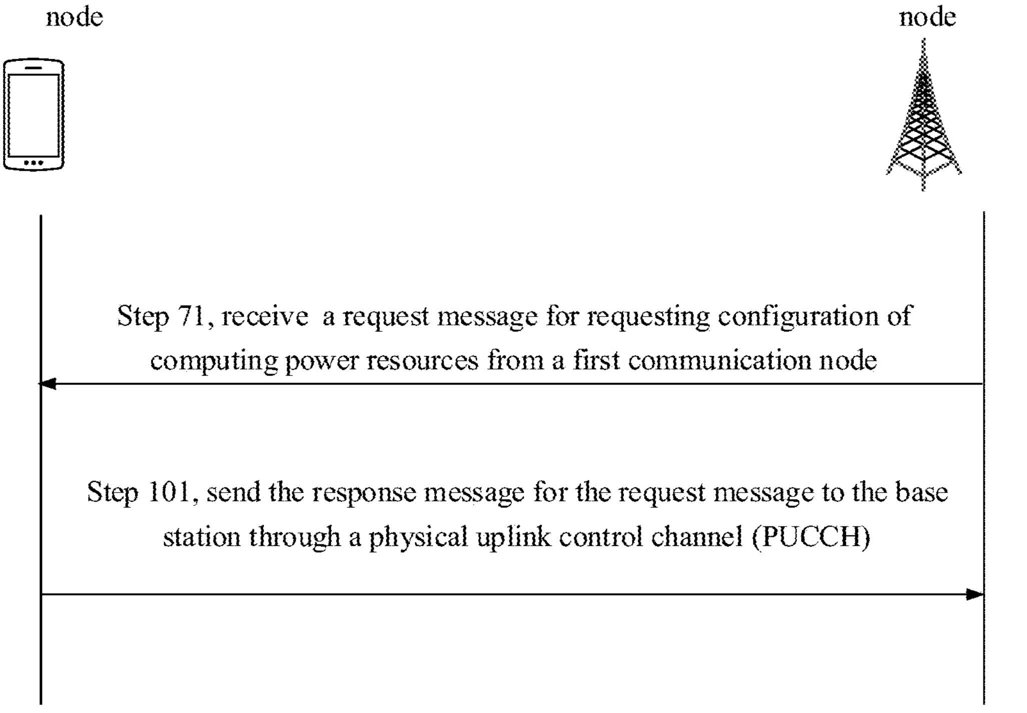
FIG. 10 is a flowchart illustrating a resource scheduling method according to an embodiment of the present disclosure.

As shown in FIG. 10, in an embodiment of the present disclosure, there is provided a resource scheduling method, where a first communication node is a base station, and a second communication node is a terminal; sending a response message for the request message to the first communication node includes:

at step 101, sending the response message for the request message to the base station through a physical uplink control channel (PUCCH).

In an embodiment, when the terminal receives a request message, the terminal may send a response message for the request message to the base station through a PUCCH.

Here, the response message is sent to the base station through the PUCCH. Since data transmission over the PUCCH is more reliable and more timely, the response message can be sent to the base station with increased reliability and speed. Thus, transmission delay is reduced, and the reliability of sending the response message is improved.

Figure 11:
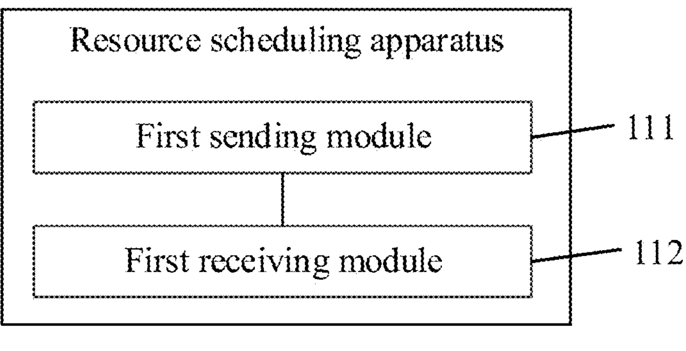
FIG. 11 is a schematic diagram illustrating a resource scheduling apparatus according to an embodiment of the present disclosure.

As shown in FIG. 11, in an embodiment of the present disclosure, there is provided a resource scheduling apparatus, which is applied to a first communication node. The apparatus includes a first sending module 111 and a first receiving module 112.

The first sending module 111 is configured to send a request message for requesting the configuration of computing power resources to a second communication node.

The first receiving module 112 is configured to receive a response message for the request message from the second communication node, where the response message carries configuration information of the computing power resources configured by the second communication node for the first communication node.

In an embodiment, the first sending module 111 is further configured to: in response to a requirement of the first communication node for configuration of the computing power resources, send the request message to the second communication node.

In an embodiment, the first communication node is a terminal, and the second communication node is a base station; the first sending module 111 is further configured to send the request message to the base station through a physical layer signaling.

In an embodiment, the first communication node is a terminal, and the second communication node is a base station; the first sending module 111 is further configured to send the request message to the base station through a physical uplink control channel (PUCCH).

In an embodiment, the first communication node is a terminal, and the second communication node is a base station; the first sending module 111 is further configured to send the request message to the base station through a radio resource scheduling request (SR).

In an embodiment, the first communication node is a base station, and the second communication node is a terminal; the first sending module 111 is further configured to send the request message to the terminal through a physical downlink control channel (PDCCH).

Figure 12:
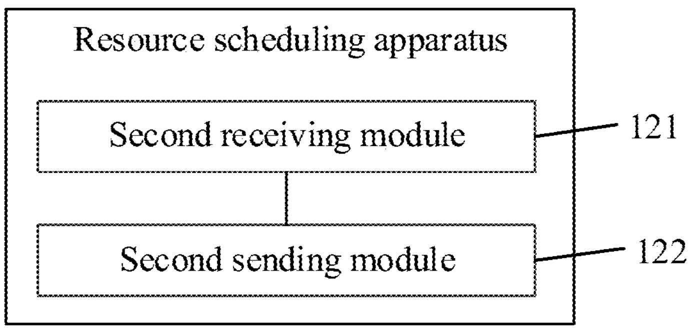
FIG. 12 is a schematic diagram illustrating a resource scheduling apparatus according to an embodiment of the present disclosure.

As shown in FIG. 12, in an embodiment of the present disclosure, there is provided a resource scheduling apparatus, which is applied to a second communication node. The apparatus includes a second receiving module 121 and a second sending module 122.

The second receiving module 121 is configured to receive a request message for requesting the configuration of computing power resources from a first communication node.

The second sending module 122 is configured to: send a response message for the request message to the first communication node based on usage of the computing power resources, where the response message carries configuration information of the computing power resources configured by the second communication node for the first communication node.

In an embodiment, the second sending module 122 is further configured to: in response to that the computing power resources requested by the first communication node are available, and/or, an amount of the computing power resources requested by the first communication node is less than an amount of computing power resources available to the second communication node, send the response message for the request message to the first communication node.

In an embodiment, the first communication node is a terminal, and the second communication node is a base station; the second sending module 122 is further configured to send the response message for the request message to the terminal through a physical downlink control channel (PDCCH).

In an embodiment, the first communication node is a base station, and the second communication node is a terminal; the second sending module 122 is further configured to send the response message for the request message to the base station through a physical uplink control channel (PUCCH).

The specific manner in which the modules in the apparatus of the above embodiments perform operations is already detailed in the method embodiments and will not be repeated herein.

In an embodiment of the present disclosure, there is provided a communication device, including:

- a processor;
- a memory, storing instructions executable by the processor;
- where the processor is configured to run the executable instructions to perform the method of any embodiment of the present disclosure.

The processor may include various types of storage mediums, which are non-transitory computer-readable storage mediums that can continue storing information thereon after the communication device is powered off.

The processor may be connected to the memory via a bus to read an executable program on the memory.

In an embodiment of the present disclosure, there is further provided a computer-readable storage medium storing a computer executable program thereon, where the executable program is executed by a processor to perform the method of any one of the embodiments of the present disclosure.

The specific manner in which the modules in the apparatus of the above embodiments perform operations is already detailed in the method embodiments and will not be repeated herein.

Figure 13:
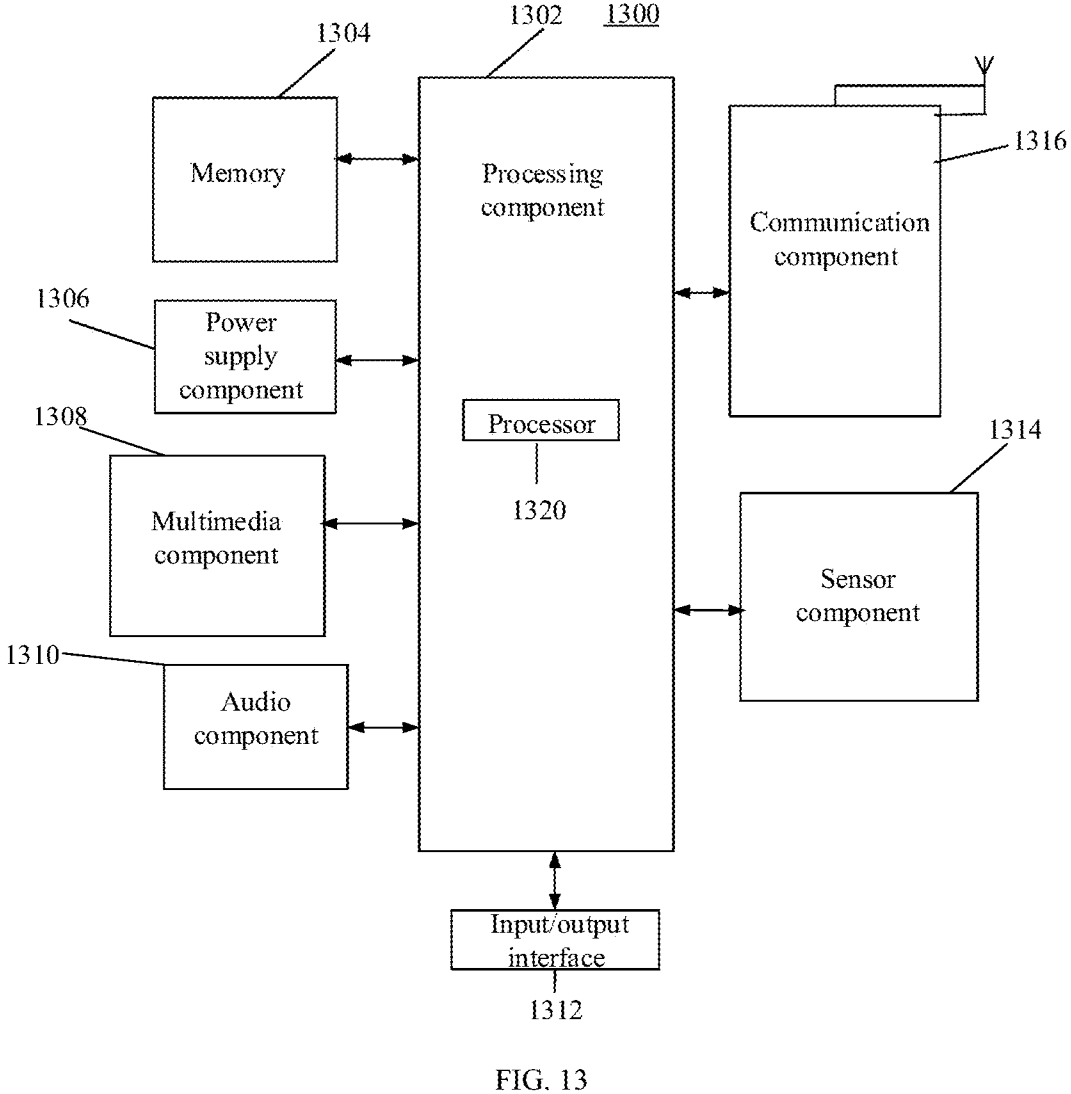
FIG. 13 is a block diagram illustrating user equipment according to an embodiment of the present disclosure.

FIG. 13 is a block diagram of user equipment (UE) 1300 according to an embodiment of the present disclosure. For example, the user equipment 1300 may be a mobile phone, a computer, a digital broadcast terminal, a message transceiver, a game console, a tablet device, a medical device, a fitness device, a personal digital assistant, and the like.

As shown in FIG. 13, the user equipment 1300 may include one or more of the following components: a processing component 1302, a memory 1304, a power supply component 1306, a multimedia component 1308, an audio component 1310, an input/output (I/O) interface 1312, a sensor component 1314, and a communication component 1316.

The processing component 1302 generally controls overall operations of the user equipment 1300, such as operations associated with display, phone calls, data communications, camera operations, and recording operations. The processing component 1302 may include one or more processors 1320 to execute instructions to complete all or part of the steps of the above methods. In addition, the processing component 1302 may include one or more modules that facilitate the interaction between the processing component 1302 and other components. For example, the processing component 1302 may include a multimedia module to facilitate the interaction between the multimedia component 1308 and the processing component 1302.

The memory 1304 is configured to store various types of data to support the operation of the user equipment 1300. Examples of such data include instructions for any application or method operated on the user equipment 1300, contact data, phonebook data, messages, pictures, videos, and so on. The memory 1304 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 1306 supplies power for different components of the user equipment 1300. The power supply component 1306 may include a power supply management system, one or more power supplies, and other components associated with generating, managing, and distributing power for the user equipment 1300.

The multimedia component 1308 includes a screen that provides an output interface between the user equipment 1300 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 1308 includes a front camera and/or a rear camera. When the user equipment 1300 is in an operation mode, such as a shooting mode or a video mode, the front camera and/or the rear camera may receive external multimedia data. Each of the front and rear cameras may be a fixed optical lens system or have a focal length and an optical zoom capability.

The audio component 1310 is configured to output and/or input audio signals. For example, the audio component 1310 includes a microphone (MIC) configured to receive an external audio signal when the user equipment 1300 is in an operation mode, such as a call mode, a recording mode, and a voice recognition mode. The received audio signal may be further stored in the memory 1304 or transmitted via the communication component 1316. In some examples, the audio component 1310 also includes a loudspeaker for outputting an audio signal.

The I/O interface 1312 provides an interface between the processing component 1302 and a peripheral interface module, which may be a keyboard, a click wheel, a button, or the like. These buttons may include, but are not limited to, a home button, a volume button, a start button, and a lock button.

The sensor component 1314 includes one or more sensors for providing a status assessment in various aspects to the user equipment 1300. For example, the sensor component 1314 may detect an open/closed state of the user equipment 1300, and the relative positioning of components, for example, the component is a display and a keypad of the user equipment 1300. The sensor component 1314 may also detect a change in position of the user equipment 1300 or a component of the user equipment 1300, the presence or absence of a user in contact with the user equipment 1300, the orientation or acceleration/deceleration of the user equipment 1300 and a change in temperature of the user equipment 1300. The sensor component 1314 may include a proximity sensor configured to detect the presence of nearby objects without any physical contact. The sensor component 1314 may also include a light sensor, such as a CMOS or CCD image sensor, for use in imaging applications. In some examples, the sensor component 1314 may also include an acceleration sensor, a gyro sensor, a magnetic sensor, a pressure sensor, or a temperature sensor.

The communication component 1316 is configured to facilitate wired or wireless communication between the user equipment 1300 and other devices. The user equipment 1300 may access a wireless network based on a communication standard, such as WiFi, 2G, or 3G, or a combination thereof. In an example, the communication component 1316 receives broadcast signals or broadcast-associated information from an external broadcast management system via a broadcast channel. In an example, the communication component 1316 also includes a near field communication (NFC) module to facilitate short-range communication. For example, the NFC module may be implemented based on a radio frequency identification (RFID) technology, an infrared data association (IrDA) technology, an ultrawideband (UWB) technology, a Bluetooth (BT) technology, and other technologies.

In an example, the user equipment 1300 may be implemented by one or more of an application specific integrated circuit (ASIC), a digital signal processor (DSP), a digital signal processing device (DSPD), a programmable logic device (PLD), a field programmable gate array (FPGA), a controller, a microcontroller, a microprocessor or other electronic elements for performing the above methods.

In an embodiment, there is further provided a non-transitory computer-readable storage medium including instructions, for example, a memory 1304 including instructions, where the above instructions are executed by the processor 1320 of the user equipment 1300 to perform the above methods. For example, the non-transitory computer-readable storage medium may be a Read Only Memory (ROM), a Random Access Memory (RAM), a CD-ROM, a magnetic tape, a floppy disk, or an optical data storage device or the like.

Figure 14:
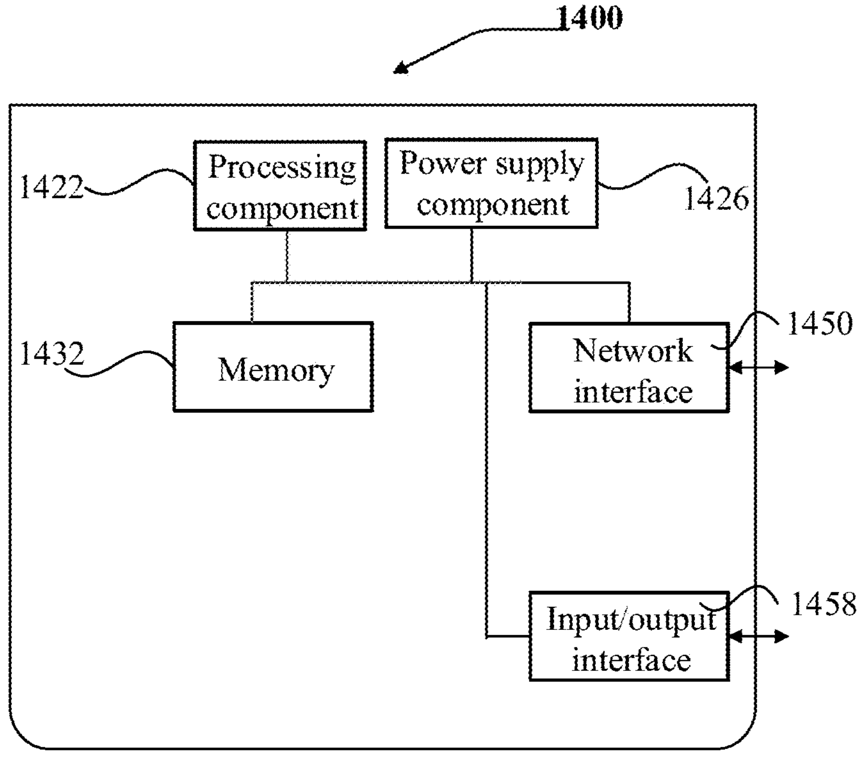
FIG. 14 is a block diagram illustrating a base station according to an embodiment of the present disclosure.

As shown in FIG. 14, in an embodiment of the present disclosure, there is provided a structure of a base station. For example, the base station 1400 may be provided as a network-side device. As shown in FIG. 13, the base station 1400 includes a processing component 1422 and further includes one or more processors and memory resources represented by a memory 1432 for storing instructions executable by the processing component 1422, for example, an application program. The application program stored in the memory 1432 may include one or more modules, each of which corresponds to one set of instructions. Further, the processing component 1422 is configured to execute the instructions to perform the method of the above applications in the base station, as shown in the methods of FIGS. 2 to 6.

The base station 1400 further includes one power supply component 1426 configured to execute power management for the base station 1400, one wired or wireless network interface 1450 configured to connect the base station 1400 to a network, and one input/output (I/O) interface 1458. The base station 1400 may be operated based on an operating system stored in the memory 1432, such as Windows Server™, Mac OS X™, Unix™, Linux™, and FreeBSD™, or the like.

In the embodiments of the present disclosure, a request message for requesting configuration of computing power resources is sent to the second communication node, and a response message for the request message is received from the second communication node, where the response message carries configuration information of the computing power resources configured by the second communication node for the first communication node. Here, the first communication node can obtain, by request, the configuration information of the computing power resources configured by the second communication node for the first communication node, and hence, the first communication node can, based on the configuration information of the computing power resources, use the computing power resources configured by the second communication node for the first communication node to perform data processing. Thus, the data processing capability of the first communication node is improved. Further, since the first communication node uses the computing power resources of the second communication node to perform data processing, the resource utilization rate of the computing power resources of the second communication node can be improved.

Other implementations of the present disclosure will be apparent to those skilled in the art from consideration of the specification and practice of the present disclosure herein. The present disclosure is intended to cover any variations, uses, modifications, or adaptations of the present disclosure that follow the general principles thereof and include common knowledge or conventional technical means in the related art that are not disclosed in the present disclosure. The specification and examples are considered exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. A resource scheduling method, comprising:

sending, by a first communication node, a request message for requesting configuration of computing power resources to a second communication node; wherein the request message comprises at least one of: a time length for occupying the computing power resources, a start time for occupying the computing power resources, and an end time for occupying the computing power resources;

receiving, by the first communication node, a response message for the request message from the second communication node; wherein the response message carries configuration information of the computing power resources configured by the second communication node for the first communication node;

wherein the computing power resources comprise computing power resources of the second communication node and/or computing power resources of a third communication node configured by the second communication node to the first communication node for use, and sending, by the first communication node, the request message to a fourth communication node, in response to no response message for the request message being received within a duration after the first communication node sends the request message to the second communication node.

2. The method of claim 1, wherein sending the request message for requesting configuration of the computing power resources to the second communication node comprises:

in response to requirement of the first communication node for configuration of the computing power resources, sending the request message to the second communication node.

3. The method of claim 1, wherein in response to the first communication node being the terminal, and the second communication node being the base station, sending the request message for requesting configuration of the computing power resources to the second communication node comprises:

sending the request message to the base station through a physical layer signaling.

4. The method of claim 1, wherein in response to the first communication node being the terminal, and the second communication node being the base station, sending the request message for requesting configuration of the computing power resources to the second communication node comprises:

sending the request message to the base station through a physical uplink control channel (PUCCH).

5. The method of claim 1, wherein in response to the first communication node being the terminal, and the second communication node being the base station, sending the request message for requesting configuration of the computing power resources to the second communication node comprises:

sending the request message to the base station through a radio resource scheduling request (SR).

6. The method of claim 1, wherein in response to the first communication node being the base station, and the second communication node being the terminal, sending the request message for requesting configuration of the computing power resources to the second communication node comprises:

sending the request message to the terminal through a physical downlink control channel (PDCCH).

7. A resource scheduling method, comprising:

receiving, by a second communication node, a request message for requesting configuration of computing power resources from a first communication node; wherein the request message comprises at least one of: a time length for occupying the computing power resources, a start time for occupying the computing power resources, and an end time for occupying the computing power resources; and sending, by the second communication node, a response message for the request message to the first communication node based on usage of the computing power resources; wherein the response message carries configuration information of the computing power resources configured by the second communication node for the first communication node;

wherein the computing power resources comprise computing power resources of the second communication node and/or computing power resources of a third communication node configured by the second communication node to the first communication node for use, and wherein the second communication node performs no response to the request message in response to the second communication node having no available computing power resource, to enable the first communication node to send the request message to a fourth communication node.

8. The method of claim 7, wherein sending the response message for the request message to the first communication node based on usage of the computing power resources comprises:

in response to that the computing power resources requested by the first communication node are available, and/or, an amount of the computing power resources requested by the first communication node is less than an amount of computing power resources available to the second communication node, sending the response message for the request message to the first communication node.

9. The method of claim 7, wherein in response to the first communication node being the terminal and the second communication node being the base station, sending the response message for the request message to the first communication node comprises:

sending the response message for the request message to the terminal through a physical downlink control channel (PDCCH).

10. The method of claim 7, wherein in response to the first communication node being the base station and the second communication node being the terminal, sending the response message for the request message to the first communication node comprises:

sending the response message for the request message to the base station through a physical uplink control channel (PUCCH).

11. A communication device, comprising:

an antenna;

a memory; and a processor, respectively connected to the antenna and the memory, and configured to execute computer executable instructions stored in the memory, wherein the computer executable instructions when executed by the processor further cause the processor to:

control transceiving operation of the antenna and perform the method of claim 7.

12. The communication device of claim 11, wherein when sending the response message for the request message to the first communication node based on usage of the computing power resources, wherein the computer executable instructions further cause the processor to:

in response to that the computing power resources requested by the first communication node are available, and/or, an amount of the computing power resources requested by the first communication node is less than an amount of computing power resources available to the second communication node, send the response message for the request message to the first communication node.

13. The communication device of claim 11, wherein in response to the first communication node being the terminal and the second communication node being the base station, when sending the response message for the request message to the first communication node, the computer executable instructions further cause the processor to:

send the response message for the request message to the terminal through a physical downlink control channel (PDCCH).

14. The communication device of claim 11, wherein in response to the first communication node being the base station and the second communication node being the terminal, when sending the response message for the request message to the first communication node, the computer executable instructions further cause the processor to:

send the response message for the request message to the base station through a physical uplink control channel (PUCCH).

15. A communication device, comprising:

an antenna;

a memory; and a processor, respectively connected to the antenna and the memory, and configured to execute computer executable instructions stored in the memory, wherein the computer executable instructions when executed by the processor cause the processor to:

control transceiving operation of the antenna, and perform operations comprising:

sending a request message for requesting configuration of computing power resources to a second communication node; wherein the request message comprises at least one of: a time length for occupying the computing power resources, a start time for occupying the computing power resources, and an end time for occupying the computing power resources;

receiving a response message for the request message from the second communication node; wherein the response message carries configuration information of the computing power resources configured by the second communication node for a first communication node;

wherein the computing power resources comprise computing power resources of the second communication node and/or computing power resources of a third communication node configured by the second communication node to the first communication node for use, and sending, by the first communication node, the request message to a fourth communication node, in response to no response message for the request message being received within a duration after the first communication node sends the request message to the second communication node.

16. The communication device of claim 15, wherein when sending the request message for requesting configuration of the computing power resources to the second communication node, wherein the computer executable instructions further cause the processor to:

in response to requirement of the first communication node for configuration of the computing power resources, send the request message to the second communication node.

17. The communication device of claim 15, wherein in response to the first communication node being the terminal, and the second communication node being the base station, when sending the request message for requesting configuration of the computing power resources to the second communication node, the computer executable instructions further cause the processor to:

send the request message to the base station through a physical layer signaling.

18. The communication device of claim 15, wherein in response to the first communication node being the terminal, and the second communication node being the base station, when sending the request message for requesting configuration of the computing power resources to the second communication node, the computer executable instructions further cause the processor to:

send the request message to the base station through a physical uplink control channel (PUCCH).

19. The communication device of claim 15, wherein in response to the first communication node being the terminal, and the second communication node being the base station, when sending the request message for requesting configuration of the computing power resources to the second communication node, the computer executable instructions further cause the processor to:

send the request message to the base station through a radio resource scheduling request (SR).

20. The communication device of claim 15, wherein in response to the first communication node being the base station, and the second communication node being the terminal, when sending the request message for requesting configuration of the computing power resources to the second communication node, the computer executable instructions further cause the processor to:

send the request message to the terminal through a physical downlink control channel (PDCCH).

* * * * *